United States Patent
Kumoluyi et al.

(10) Patent No.: US 8,341,408 B2
(45) Date of Patent: *Dec. 25, 2012

(54) SYSTEM AND METHOD FOR PROVIDING VARIABLE SECURITY LEVEL IN A WIRELESS COMMUNICATION SYSTEM

(75) Inventors: Akinlolu Oloruntosi Kumoluyi, Summerfield, NC (US); Alexander Reznik, Titusville, NJ (US); Guodong Zhang, Farmingdale, NY (US); Prabhakar R. Chitrapu, Blue Bell, PA (US); Sung-Hyuk Shin, Northvale, NJ (US); Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/365,126

(22) Filed: Feb. 2, 2012

(65) Prior Publication Data

US 2012/0128158 A1    May 24, 2012

Related U.S. Application Data

(63) Continuation of application No. 12/645,377, filed on Dec. 22, 2009, now Pat. No. 8,135,953, which is a continuation of application No. 11/241,429, filed on Sep. 30, 2005, now Pat. No. 7,636,842.

(60) Provisional application No. 60/642,691, filed on Jan. 10, 2005.

(51) Int. Cl.
*H04L 29/06* (2006.01)
(52) U.S. Cl. ...................................... 713/166
(58) Field of Classification Search ............... None
See application file for complete search history.

(56) References Cited

U.S. PATENT DOCUMENTS

| | | | |
|---|---|---|---|
| 5,935,248 | A | 8/1999 | Kuroda |
| 6,052,576 | A | 4/2000 | Lambourg |
| 6,504,930 | B2 | 1/2003 | Enari |
| 6,570,610 | B1 | 5/2003 | Kipust |
| 7,636,842 | B2 | 12/2009 | Kumoluyi et al. |

(Continued)

FOREIGN PATENT DOCUMENTS

| | | |
|---|---|---|
| EP | 1 494 121 | 1/2005 |
| EP | 1494121 | 1/2005 |
| JP | 2000-307603 | 11/2000 |
| TW | 461193 | 10/2001 |
| TW | 2004/10534 | 6/2004 |
| WO | 2004/015966 | 2/2004 |

OTHER PUBLICATIONS

Henning, "Vulnerability Assessment in Wireless Networks," Proceedings of the 2003 Symposium on Applications and the Internet Workshops, pp. 358-362 (2003).

(Continued)

*Primary Examiner* — Brandon Hoffman
(74) *Attorney, Agent, or Firm* — Volpe and Koenig, P.C.

(57) ABSTRACT

A system and method for providing variable security levels in a wireless communication network. The present invention optimizes the often conflicting demands of highly secure wireless communications and high speed wireless communications. According to a preferred embodiment of the present invention, various security sensors are scanned to determine the likely presence of an intruder within a predetermined trust zone. If an intruder is likely present, the security level is changed to the highest setting, and consequently a lower data rate, while the intruder is identified. If the identified intruder is in fact a trusted node, the security level is returned to a lower setting. If the identified intruder is not a trusted node, the security level is maintained at an elevated state while the intruder is within the trust zone.

13 Claims, 4 Drawing Sheets

U.S. PATENT DOCUMENTS

2003/0232598 A1    12/2003    Aljadeff et al.
2005/0037733 A1    2/2005    Coleman et al.
2006/0090200 A1    4/2006    Oie

OTHER PUBLICATIONS

Huang et al., "A Cooperative Intrusion Detection System for Ad Hoc Networks," Proceedings of the First ACM Workshop on Security of Ad Hoc and Sensor Networks, pp. 135-147 (2003).

PC User, vol. 8, No. 18, Softbank Publishing Co., Ltd., p. 124 (Oct. 24, 2001).

Tao et al., "Wireless LAN Location-Sensing for Security Applications," Proceedings of the $2^{nd}$ ACM Workshop on Wireless Security, pp. 11-20 (2003).

Vlachos et al., "Security Applications of peer-to-peer networks," Computer Networks, vol. 45, No. 2, pp. 195-205 (2004).

Withington et al., "Enhancing Homeland Security with Advanced UWB Sensors," IEEE Microwave Magazine, vol. 3, Issue 4, pp. 51-58 (Sep. 2003).

SYSTEM AND METHOD FOR PROVIDING VARIABLE SECURITY LEVEL IN A WIRELESS COMMUNICATION SYSTEM

CROSS REFERENCE TO RELATED APPLICATIONS

This application is a continuation of U.S. patent application Ser. No. 12/645,377, filed Dec. 22, 2009, which issued as U.S. Pat. No. 8,135,953 on Mar. 13, 2012, which is a continuation of U.S. patent application Ser. No. 11/241,429, filed Sep. 30, 2005, which issued as U.S. Pat. No. 7,636,842 on Dec. 22, 2009, which claims the benefit of U.S. Provisional Application Ser. No. 60/642,691 filed Jan. 10, 2005, the contents of which are hereby incorporated by reference herein.

FIELD OF INVENTION

The present invention relates generally to wireless communication network security. In particular, the invention relates to methods for providing secure communications in a wireless communication system.

BACKGROUND

The nature of wireless communication networks makes them very susceptible to attack. Various security methods are currently implemented to secure wireless communications between wireless transmit/receive units (WTRUs) and other WTRUs, and between WTRUs and wireless access points (APs). These security methods include, for example, various types of encryption, which is the process of encoding information in such a way that only a recipient with the appropriate key can decode the information. Other technologies for protecting wireless data include, for example, error-correcting codes, checksums, hash functions (including message authentication codes), digital signatures, secure socket layer (SSL) technology, and the like.

Various wireless communication networks employ various security technologies. For example, an IEEE 802.11a/b wireless local area network (WLAN) employs wired equivalent privacy (WEP), a symmetric key encryption scheme, for securing wireless communications across a wireless network. An IEEE 802.11i WLAN employs Wi-Fi protected access (WPA) for securing wireless communications across the network. Cellular networks, for example GSM and UMTS networks, use the Authentication and Key Agreement Protocols (AKA) which utilize integrity keys, cipher keys, and anonymity keys. These keys form the basis for the confidentiality, integrity, authentication, and anonymity of the security system. Typically, the security method or technology utilized is dictated by the applicable standards.

These security technologies require large amounts of computational power, thereby creating a potential bottleneck in the speed at which the network operates. For example, a Palm™ III-X handheld WTRU requires 3.4 minutes to perform 512-bit RSA key generation, 7 seconds to perform digital signature generation, and can perform DES encryption for at most 13 kbps. Increased electrical power consumption is an additional drawback associated with highly secure encryption algorithms.

Accordingly, the competing interests of data security and network performance typically result in a fixed level of network security. Generally, the data rate of a network is inversely proportional to the security level of the network. That is, increasing a wireless network's security decreases the rate at which data can be conveyed across the network. The security parameters selected by a network administrator typically optimize these competing interests for a particular use of the wireless communication network.

FIG. 1 is an illustration of a conventional wireless communication network 100 operating with a fixed security level. The network shown in FIG. 1 is a wireless local area network (WLAN), such as one typically found in homes and small businesses. An access point 110 connects the WLAN to the Internet 120 and an intranet 125, and routes data transmitted between a plurality of WTRUs 130 generally, and $130_1$, $130_2$, $130_3$ specifically, within a trust zone 140 extending a predetermined distance from the wireless access point 110. The WTRUs 130 possess the appropriate encryption key or other required information, depending on the nature of the security technology utilized by the network 100.

The security level maintained among devices operating within the trust zone 140 of the network 100 is static; it will not change unless the security settings are adjusted or the security is turned off by the system administrator. To illustrate, an intruder WTRU 150 is located outside the trust zone 140 at position A. When the intruder WTRU 150 enters into the trust zone 140 at position B, the security level of the system remains unchanged. The intruder WTRU 150 either has the necessary encryption key or other information as required by the security technology currently in use, or it does not. If the intruder WTRU 150 possesses the appropriate encryption key or other necessary information, the intruder WTRU 150 may then access the network 100. If, however, the intruder WTRU 150 does not possess the required encryption key or other necessary information, the intruder WTRU 150 will be unable to communicate with the network 100.

Accordingly, the network 100 unnecessarily utilizes large amounts of resources on security when only trusted WTRUs 130 are operating within the network 100. As a result, the network 100 sacrifices the ability to provide higher data rates by maintaining unnecessarily high security levels when only trusted WTRUs 130 are operating within the trust zone.

Therefore, a method for providing variable security in a wireless communication network is desired.

SUMMARY

The present invention is a system and method for providing variable security levels in a wireless communication network. The present invention optimizes the often conflicting demands of highly secure wireless communications and high speed wireless communications. According to a preferred embodiment of the present invention, various security sensors are scanned to determine the likely presence of an intruder within a predetermined trust zone. If an intruder is likely present, the security level is changed to the highest setting, and consequently a lower data rate, while the intruder is identified. If the identified intruder is in fact a trusted node, the security level is returned to a lower setting. If the identified intruder is not a trusted node, the security level is maintained at an elevated state while the intruder is within the trust zone.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 1:
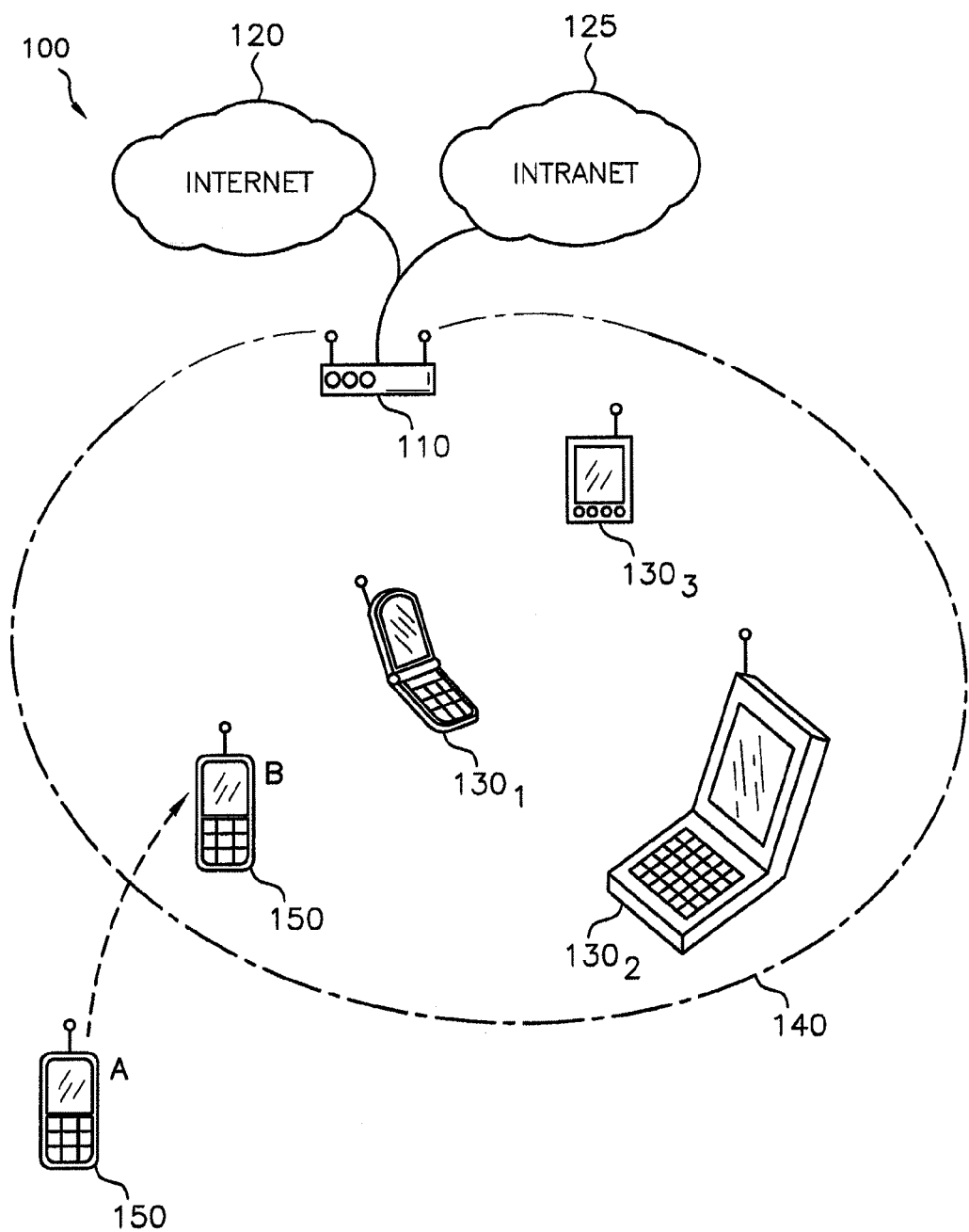
FIG. 1 is an illustration of a conventional wireless communication system having a predetermined trust zone, wherein a plurality of trusted WTRUs are operating, and an intruder WTRU enters the trust zone.

The present invention will be described in more detail with reference to the drawing figures wherein like numerals indicate like elements.

As referred to herein, a wireless transmit/receive unit (WTRU) includes, but is not limited to, a cell phone, pager, laptop, user equipment (UE), mobile station (MS), a fixed or mobile subscriber unit, or any other device capable of operating in a wireless communication system. As referred to herein, the term 'access point' includes but is not limited to a base station, a Node-B, a site controller, or any other type of interfacing device in a wireless environment. As referred to herein, a 'node' may be either a WTRU or an access point. As referred to herein, the term 'trust zone' means a physical space in which the network is able to determine the likely presence of a WTRU or other mobile device, operating in an expected manner. As referred to herein, the term 'intruder' means any WTRU or other mobile device operating within a trust zone that is not associated with the wireless communication network.

In a preferred embodiment of the present invention, a wireless communication system dynamically changes its security level based on the presence of an intruder within a trust zone. For simplicity, the invention will be described in the context of an 802.11 WLAN using WEP security. It should be understood by those skilled in the art that this implementation of the present invention is exemplary and not limiting, and the invention may be carried out in various types of wireless communication networks, such as, for example, 3G, 802.x, GPRS, or the like, using various security protocols such as symmetric encryption, asymmetric encryption, error-correcting codes, checksums, hash functions (including message authentication codes), digital signatures, SSL, or the like, alone or in combination.

Figure 2:
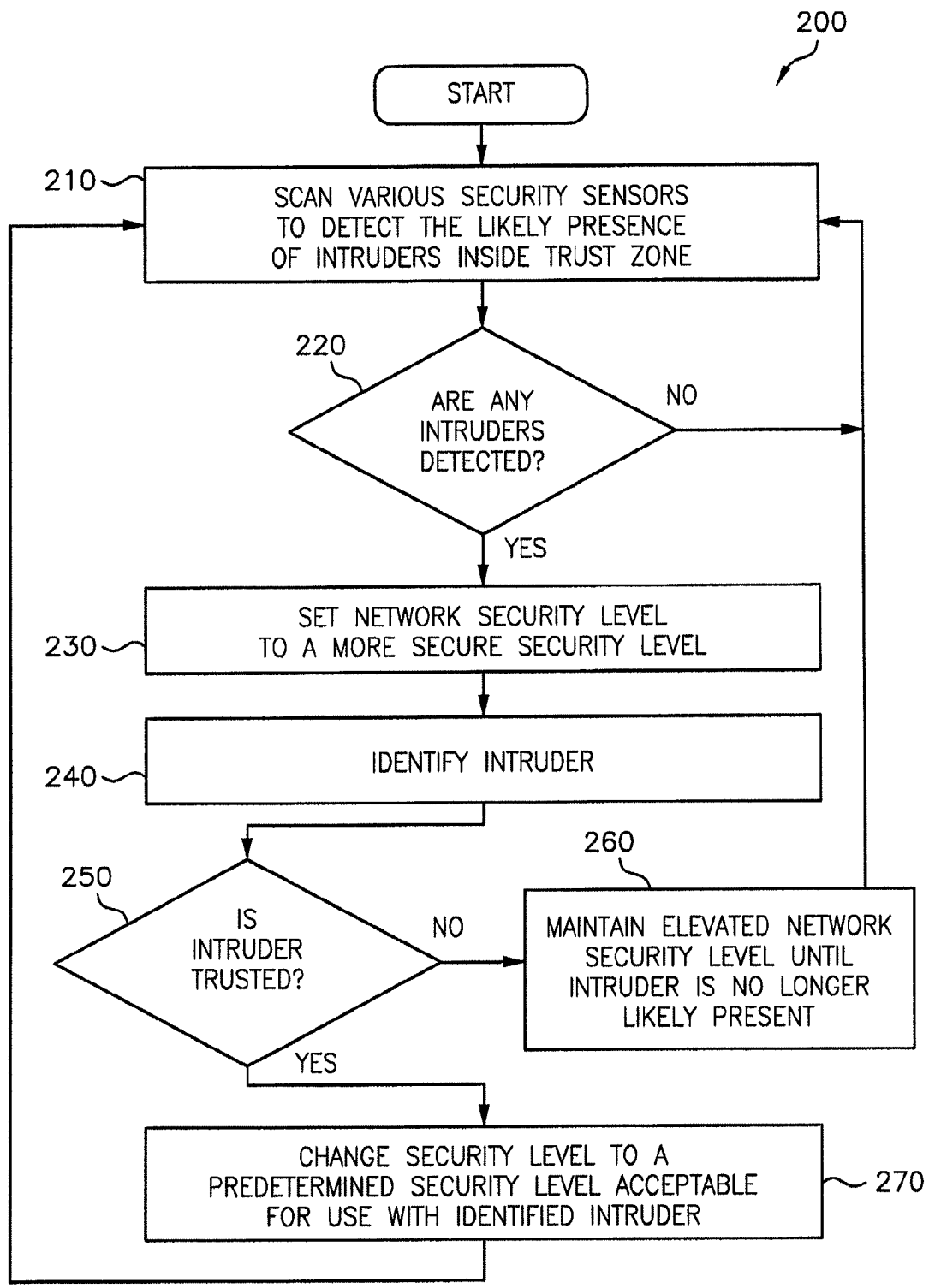
FIG. 2 is a flow diagram of a method for providing variable level security in a wireless communication system according to a currently preferred embodiment of the present invention.

Referring to FIG. 2, a method 200 for providing variable level security in a wireless communication network according to a preferred embodiment of the present invention is shown. The method 200 begins when the wireless communication system is brought online. Alternatively, a system administrator may enable and disable the variable level security method as desired. Various security sensors scan the trust zone for intruders, (step 210). The various security sensors may include, for example, individually or in various combinations, infra-red sensors, video monitoring sensors, photoelectric sensors, motion sensors, audio sensors, or the like. Traditional radio frequency (RF) sensors such as antennas, smart antennas, or the like may also be used to scan for likely intruders. Various signal quality metrics, such as, for example, channel impulse response (CIR) for signal-band channel changes may also be used as a means of detecting intruders. Additionally, spatial/frequency/temporal CIR or the like may be used.

The system administrator may adjust the settings and parameters of the various security scanning devices to adjust their thresholds and sensitivity for determining whether an intruder is likely present. It is then determined, based on the security sensor scans, whether any intruders are likely present, (step 220). If no intruder is detected, the method returns to step 210 for further scanning.

If an intruder is detected, the security level of the network is immediately raised to a level higher than the current level, (step 230). This elevated security level may be, for example, where the wireless system is utilizing public key encryption (e.g. wired equivalent privacy (WEP)) for security, a longer public key. For example, the key length may be increased from 64 bits in length to 128 bits in length, providing a higher level of security.

Alternatively, when the wireless system is utilizing asymmetric encryption techniques, the frequency of the key changes may be increased to provide a higher level of security. Trusted users may be alerted to the presence of a likely intruder and notified of the resulting increase in security level and associated decrease in data rates. Alternatively, when communications in a wireless network are both encrypted and unencrypted, an elevated security level may be provided by restricting all unencrypted communications, only allowing encrypted communications. Alternatively, when either the AP or the WTRU, or both, are equipped with switched beam antennas, a higher level of security may be provided by beam steering techniques designed to create null areas covering the intruder's spatial location. Methods for using beam steering techniques in this manner are well known in the art. These techniques may be used in combination or alone, providing an elevated security level as desired.

The system administrator determines the various levels of security to which the system will change upon the detection of a likely intruder, as desired. Alternatively, the system can be set by the system administrator to stop transmitting data all together. However, this may not be practical in certain types of communication systems, such as, for example, a 3G wireless communication system implemented primarily for voice communications.

While the system is operating at an elevated security level, the likely intruder is identified, (step 240). Where the intruder is a wireless communication device, identification of the intruder may occur, for example, via polling, signaling, referencing a database, remote attestation, whereby a challenger can ascertain the security properties of an intruding device, RF channel sensing, and/or CIR signatures. Various other identification techniques are well known in the art.

The method 200 then determines whether the identified intruder is trusted, (step 250). This may include determining whether the identified intruder is operating in an expected manner. Where the intruder is another wireless communication device, the intruder may at some point in time attempt to register with the network. Such a process of registration will identify the intruder to the network. A database of known and trusted devices may or may not be referenced for this determination. In other cases, for example, when the policy is to stop data transmission or to null the intruder's spatial location, intruder identification may not be necessary.

If the network determines the identified intruder is not trusted, or the network is unable to identify the intruder as trusted, an elevated level of security is maintained while the identified intruder is likely present within the trust zone, (step 260). If, on the other hand, the network determines the identified intruder is trusted, the security level is set to a predetermined security level appropriate for use with the identified intruder, (step 270). When beam steering is used to null the signals covering an intruder's location, an intruder determined to be a trusted intruder is allowed into the network by ceasing the nulling. In either case, the method 200 returns to step 210 for further scanning.

Typically, decisions to alter security settings are first made locally where the intruder is identified. Then the intruder identification and any additional information, such as any classification information, location information, or the like, is distributed throughout the network. For example, in a WLAN, the identification of an intruder may occur at both a WTRU and at the AP. (It should be noted that since APs typically possess more functionality than WTRUs, it is more likely that the AP will identify an intruder.) Any station that identifies an intruder immediately changes its own security policy, and begins notifying other nodes of the network.

Figure 3:
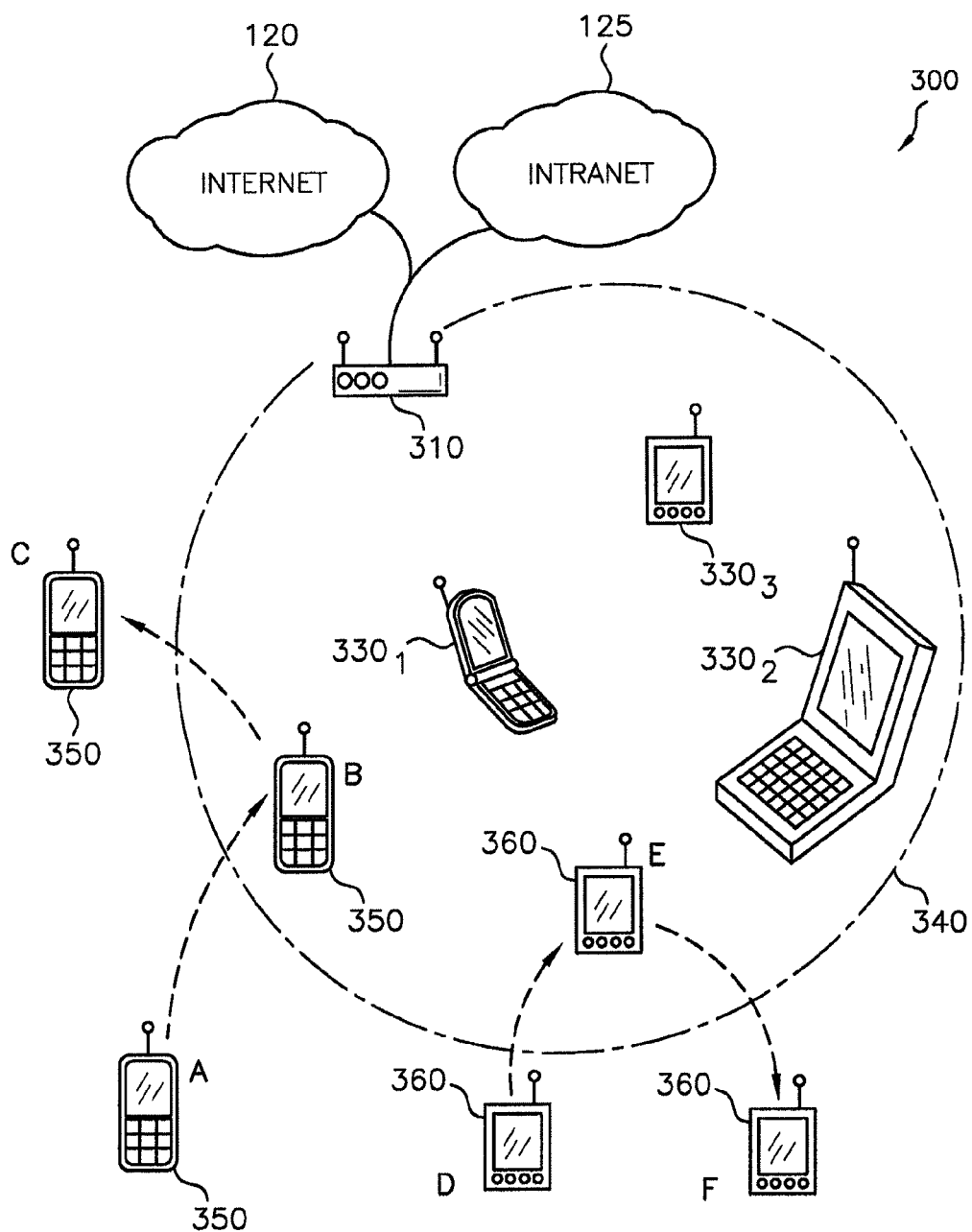
FIG. 3 is an illustration of a wireless communication system having a predetermined trust zone wherein a plurality of trusted WTRUs are operating and variable level security is implemented in accordance with the present invention.

Referring to FIG. 3, an illustration of a wireless communication network operating in accordance with the present invention is shown and generally designated 300. The network 300, purely by way of example, is an IEEE 802.11x network utilizing WEP security technology. An access point 310 wirelessly connects a plurality of WTRUs, generally designated 330, to the Internet 120 and an intranet 125. A trust zone 340 extends a predetermined distance from the access point 310. The size or extent of the trust zone may be modified by the system administrator based on a variety of parameters as desired. WTRUs that are identified by the network and determined to be trusted WTRUs are designated $330_1$, $330_2$, and $330_3$ specifically, and generally 330.

In order to demonstrate the operation of variable level security of the present invention, two examples of variable level security will now be described. When an intruder WTRU 350 is positioned outside the trust zone at position A, the network security level is set as desired for trusted communications. Typically, this security level setting will be a relatively low level of security so that a higher level of data throughput is achieved. For example, where the network is using WEP encryption to secure wireless communications, a relatively low level of security is a 64-bit key, or no key at all. When the intruder WTRU 350 enters the trust zone 340 at position B, various security sensors determine the likely presence of an intruder. Upon determining the presence of the intruder WTRU 350 at position B, the network raises the security level, for example, the encryption key length may be set at 128 bits. The network attempts to identify intruder WTRU 350. In this first example, the intruder WTRU 350 is not associated with the network 300 and is determined to not be trusted. Accordingly, the security level is maintained at an elevated level while the intruder WTRU 350 is located at position B. When intruder WTRU 350 exits the trust zone 340 and is located at position C, the network 300 may return to a lower security level.

Alternatively, referring still to FIG. 3, in a second example an intruder WTRU 360 that is in fact a trusted WTRU is positioned outside of the trust zone 340 at position D. Upon entering the trust zone 340, intruder WTRU 360 is located at position E and is sensed by various network security sensors associated with the network 300. Upon this determination that an intruder is likely present, the security level of the network 300 is raised. The intruder WTRU 360 is then authenticated by the network 300 as a trusted WTRU, using methods well known in the art. The security level of the network 300 is then returned to its original relatively low security level.

In an alternative embodiment of the present invention, again referring to FIG. 3, the variable security levels may be configured to correspond to various WTRUs that are within the trust zone of the network. For example, referring again to FIG. 3, intruder WTRU 360 that is in fact a trusted WTRU, moves inside the trust zone 340 to position E. The security level is raised and the intruder WTRU 360 is authenticated. When the intruder WTRU 360 exits the trust zone 340 by moving to position F, the security level is lowered, but preferably not to its original security level. The security level is preferably set at an intermediate level. In this manner, the variable security method of the present invention provides a wireless variable security method that is configurable to the specific WTRUs operating within the network 300, thus optimizing transmission speed and network security to the specific network condition.

It should be understood by those of skill in the art that many levels of security may be implemented depending on the perceived threat to network security as measured by various sensors throughout the communication system. A system administrator may set the various levels as desired.

It should be understood by those of skill in the art that variable level security may be achieved by utilizing other well-known data protection schemes. These techniques include, but are not limited to, varying the parameters of error-correcting codes, checksums, hash functions (including message authentication codes), digital signatures, various ciphers, changing the type of cipher altogether, changing antenna patterns, fully or partially interrupting transmissions, varying transmit power, or the like.

Figure 4:
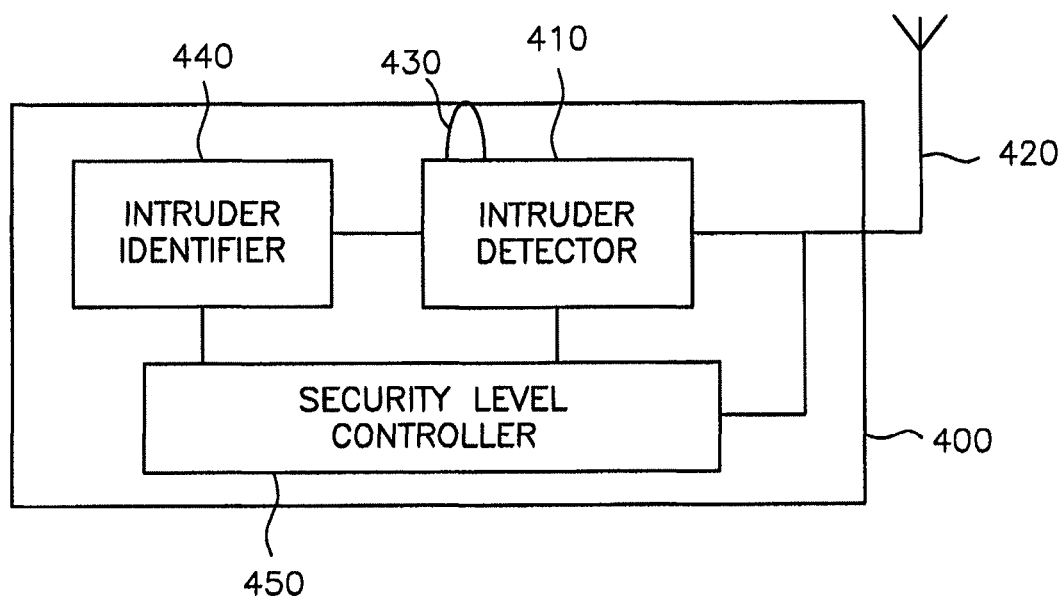
FIG. 4 is a block diagram of a node for performing variable level security in accordance with the present invention.

Referring to FIG. 4, a node 400 for performing variable level security in a wireless communication system in accordance with the present invention is shown. The node 400 may be an access point, a WTRU, or any other device capable of operating in a wireless environment. The node 400 includes an intruder detector 410. The intruder detector 410 is configured to detect the presence of intruders within a trust zone. More specifically, the intruder detector 410 receives and processes data regarding intruders via antenna 420 wherein the antenna 420 is operating as a sensor. The antenna 420 may also receive data regarding intruders from other sensors deployed throughout the trust zone. In another embodiment of the present invention, the node 400 may be configured to receive data regarding intruders from sensors that are hardwired to the node 400 via port 430. As mentioned above, the sensors may be various types of sensors for detecting intruders. In a preferred embodiment of the present invention, upon detection of an intruder, the intruder detector 410 notifies the security level controller 450 which immediately sets the network security level via antenna 420 to the most secure security level. Alternatively, upon detection of an intruder, the security level is raised to an elevated security level predetermined by a system operator. The intruder detector 410 may alternatively be provided with a processor for increasing the security level upon detection of an intruder within a trust zone so that it may raise the security level without interfacing with the security level controller 450.

The intruder identifier 440 receives data from the intruder detector 410 regarding detected intruders. The intruder identifier 440 determines the identity of an intruder and whether the intruder is in fact a trusted device or not. As disclosed above, various authentication methods may be used in identifying and determining the trustworthiness of the intruder, for example, via polling, signaling, referencing a database, remote attestation, whereby a challenger can ascertain the security properties of an intruding device, RF channel sensing, CIR signatures, and other methods well known in the art. A database of trusted devices may be used in determining whether an intruder device is trusted. Alternatively, determining whether the device is trusted may include determining whether the identified intruder is operating in an expected manner.

The node 400 further includes a security level controller 450 for determining and managing the security level of the communication system. The security level controller 450 receives data regarding the identity and trust status of a detected intruder from the intruder identifier 440. When the intruder identifier 440 determines an intruder is not a trusted device, the security level controller 450 raises the security level to a more secure security level. When the intruder identifier 440 determines an intruder is in fact a trusted device, the security level controller 450 may lower the security level to a lower security level, thereby increasing data rates. Alternatively, an intermediate security level may be utilized, as desired, according to operator preference. In a preferred embodiment, when a security level has previously been elevated upon detection of an intruder within the trust zone, the security level is maintained in an elevated state upon determination that the intruder is not a trusted device. The elevated security state may be the same or different from the security level in place prior to detection of the intruder. The security level controller 450 communicates changes in the security level and the presence of both trusted and not trusted intruders to other nodes operating within the communication system via antenna 420.

The security level controller 450 further controls and stores the various security data required to implement variable level security. This data includes, for example, encryption keys, length of the current encryption keys, hash functions, authentication keys, SSIDs, and the like. When asymmetric cryptography is used, the security level controller 450 controls the cycling of the public keys.

The intruder detector 410, intruder identifier 440, and the security level controller 450 may be incorporated into an integrated circuit (IC) or be configured in a circuit comprising a multitude of interconnecting components or any other type of circuit and/or processor. As one skilled in the art should realize, the functions of the various components of node 400 may be performed by various other components or combinations of components, and/or may be performed in different components or combinations of components than those described herein.

Although the present invention has been described with reference to the preferred embodiments, those skilled in the art will recognize that changes may be made in form and detail without departing from the scope of the invention.

What is claimed is:

1. A method for providing security, comprising:
   providing a security level for a trust zone;
   detecting the presence of an intruder wireless device within the trust zone; and
   providing an enhanced security level for the trust zone upon detection of the intruder wireless device, wherein the enhanced security level is more secure than the security level.

2. The method of claim 1, wherein the enhanced security level has an increased bit length of an encryption key that uses symmetric key cryptography.

3. The method of claim 2, wherein the key length is increased from 64 bits to 128 bits.

4. The method of claim 1, wherein the enhanced second security level has an increased frequency at which a public key utilizing asymmetric key cryptography is changed.

5. The method of claim 1, further comprising:
   changing the enhanced security level to a lower security level on a condition that the detected intruder wireless device is a trusted device.

6. The method of claim 1, further comprising:
   maintaining the enhanced security level on a condition that the detected intruder wireless device is not a trusted device.

7. The method of claim 1, further comprising:
   terminating all communications across the trust zone upon provision of the enhanced security level.

8. The method of claim 1, further comprising:
   scanning the trust zone with at least one sensor selected from the group consisting of: infra-red sensors, video monitoring sensors, photo-electric sensors, motion detecting sensors, and audio sensors.

9. The method of claim 8, wherein the scanning the trust zone comprises analyzing a channel impulse response.

10. The method of claim 8, wherein scanning the trust zone comprises analyzing at least one of a spatial channel impulse response, a frequency channel impulse response, and a temporal channel impulse response.

11. The method of claim 1, further comprising:
    scanning the trust zone with at least one radio frequency sensor selected from the group consisting of: antennas, and smart antennas.

12. The method of claim 1, wherein providing the enhanced security level comprises restricting unencrypted communication.

13. The method of claim 1, wherein providing the enhanced security level comprises steering a directional beam to create a null area in the geographic location of the intruder wireless device.

* * * * *